UNITED STATES PATENT OFFICE.

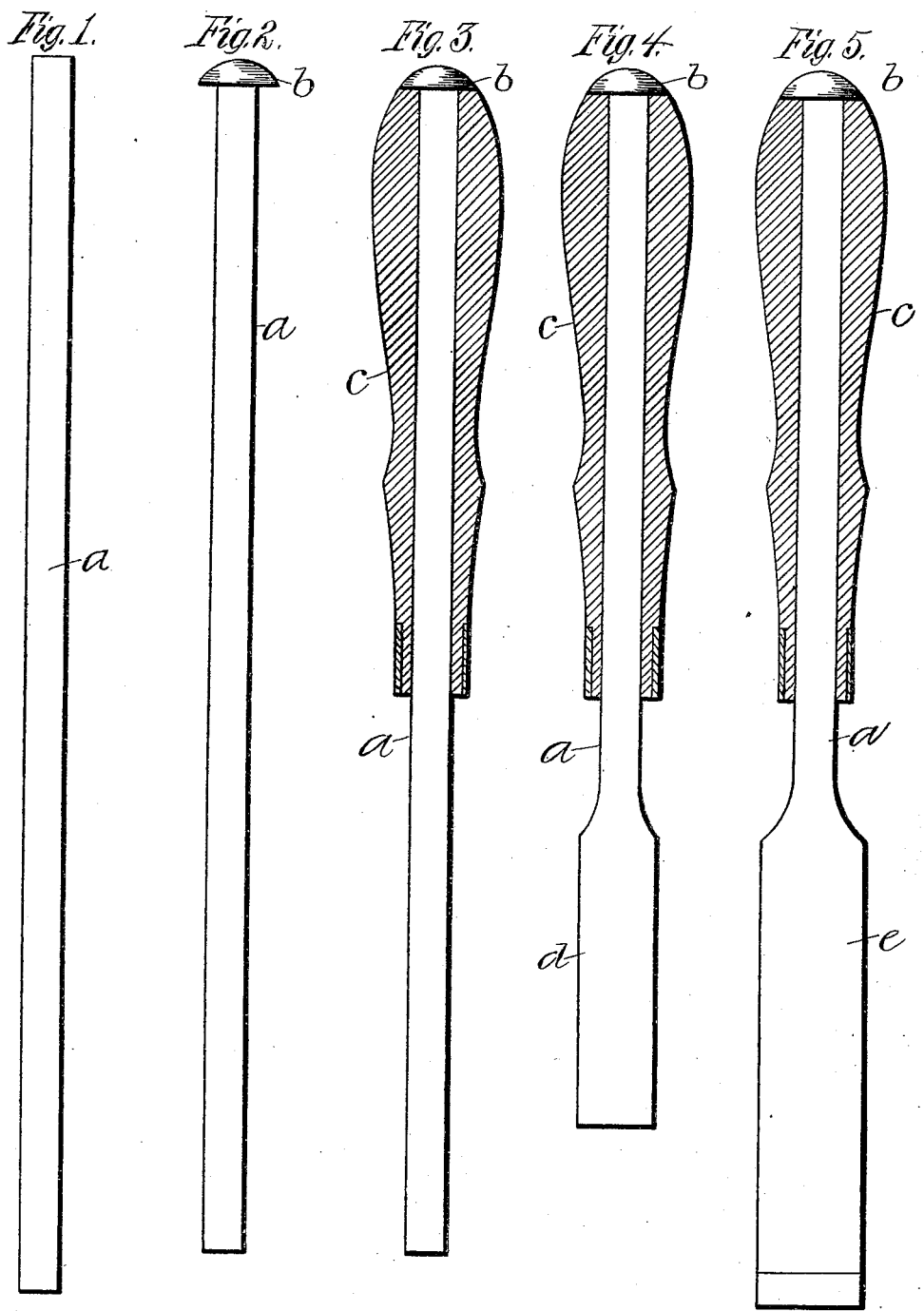

GEORGE E. WOOD, OF SOUTHINGTON, CONNECTICUT.

PROCESS OF MANUFACTURING TOOLS.

932,223. Specification of Letters Patent. Patented Aug. 24, 1909.

Application filed October 2, 1905. Serial No. 280,883.

*To all whom it may concern:*

Be it known that I, GEORGE E. WOOD, a citizen of the United States, and a resident of Southington, in the county of Hartford and State of Connecticut, have invented a new and Improved Process of Manufacturing Tools, of which the following is a specification.

My invention relates more especially to that class of tools having a metal blade and shank thereon to which shank is secured a handle of soft material.

Heretofore it had been customary in making hand tools of this character to form a head on one end of a metal rod, then place the handle thereon, and finally draw the projecting portion of the rod to form a blade. It is obvious that a blade formed from a rod of stock material must be limited in width by the size of the rod from which it is drawn, and it has therefore been considered impracticable to produce tools with wide blades by the process above described, owing to the fact that if a rod of a size to make a wide blade be employed, the handle surrounding the stem or shank thereof is of such size as to be unwieldy and impracticable for general use. Hence, hand tools, in which the handle is situated between a head integral with the shank or stem and the blade, only with relatively narrow blades, have been produced. I have discovered that such a tool may be produced having a relatively wide blade, from a small rod and after the handle has been placed thereon against an integral head, by upsetting a portion of the bar lying outside of the handle to form a blank of increased size in cross section from which a blade of the desired width may be finally drawn.

When in this specification I use the term "wide blade," I mean a blade that is of a width greater than that which may be produced from a rod or piece of stock material of a size in cross section corresponding with the size of the rod over which the handle is slipped, and which is the size of the rod upon which the first step of my improved process, that is, the formation of the head, is performed.

A tool produced by my improved process is illustrated herein, in which—

Figure 1 is a view of the tool blank. Fig. 2 is a view of the blank with a head formed thereon. Fig. 3 is a view of the tool blank and head with a handle in place thereon, the latter being shown in section. Fig. 4 is a view similar to Fig. 3, the end of the blank having been upset to form stock for producing a blade. Fig. 5 is a view showing the finished product.

In producing a tool as a chisel, screwdriver or the like in which a metal head overlies the handle composed of wood or other comparatively soft material, this head on the end of the shank is commomly produced by heading over the end of the shank. This head, however, must be produced before the handle is placed thereon in order that a square shoulder may be formed underneath the head against which the handle rests. A desired manner of producing a blade for such a tool is to provide a blank of a certain size in cross-section and then upset this blank to provide a sufficient quantity of stock from which to produce a blade having dimensions in cross section wider than could be produced from the original blank.

A tool having a head on the end of the shank with a handle located thereon and with a blade formed as above described, has not before been produced for the reason that it has been considered impossible to form a blade in this manner after the handle has been placed in position, and in order to construct a tool after this process the handle must be placed in position, as it will readily be observed, before the stock can be upset and the blade produced. By extended experiment I have found that I can construct a tool after such a process.

In carrying out my invention I first provide a blank *a*. These blanks are cut from a rod of stock of proper size and form in cross-section. The cross-sectional form may vary and I have found that blanks having different forms in cross-section may be employed to successfully carry out the invention. A head *b* is then formed upon this blank, this head being produced by a riveting or swagging operation in the common manner. After the head has been formed a handle *c* is driven on from the opposite end of the blank and firmly seated against the head of the tool. The blank has thus far maintained its original form except that it has been shortened a trifle in the heading operation. The next step in the process consists in upsetting a portion of the shank that projects beyond the handle, so that the finished blade may be relatively wide. In Fig. 4 I have illustrated the rod *a* as being upset to produce a blank *d* larger in cross section than the original rod. By this operation it is readily seen that a blank is formed from a small rod after the handle has been placed thereon, from which a blade, having a wide working edge, may be produced. The blank is now in proper form for the final operation which consists in drawing out a blade *e*, as shown in Fig. 5 of the drawings. After this blade has been drawn out it may be tempered, ground and subjected to the final operations.

I have provided means whereby a tool may be produced after the above-described process without injury to the handle in the upsetting and drawing operations, and it will be obvious that by thus producing a tool such tool can be constructed at a less cost owing to the comparatively small stock from which it may be produced, the stock originally employed being in the form of a rod and much smaller in cross-section area than that part from which the blade of the tool is afterward produced.

What I claim as my invention and desire to secure by Letters Patent is:—

1. The process of producing a tool having a handle and a wide blade that consists in providing a blank of comparatively small dimensions in cross-section, forming an integral head at one end of the blank, securing a handle upon said blank, upsetting the projecting end of the blank and increasing its thickness and then drawing a blade from said enlarged part of greater width than possible to produce from the original blank.

2. The process of producing a tool that consists in integrally forming a head at one end of a metallic blank of comparatively small dimensions in cross-section, securing a handle upon said blank and against said head, upsetting the projecting end of the blank to a point comparatively close to said handle, and then drawing a blade from said enlarged portion.

GEORGE E. WOOD.

Witnesses:
 ARTHUR B. JENKINS,
 EDWIN C. DICKENSON.